(12) United States Patent
Orita

(10) Patent No.: US 9,850,825 B2
(45) Date of Patent: Dec. 26, 2017

(54) VEHICLE CONTROL DEVICE WITH AUTOMATIC ENGINE STOP FUNCTION

(71) Applicant: NISSAN MOTOR CO., LTD., Yokohama-shi, Kanagawa (JP)

(72) Inventor: Shuichi Orita, Chigasaki (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 115 days.

(21) Appl. No.: 14/432,492

(22) PCT Filed: Oct. 2, 2013

(86) PCT No.: PCT/JP2013/076790
§ 371 (c)(1),
(2) Date: Mar. 31, 2015

(87) PCT Pub. No.: WO2014/054677
PCT Pub. Date: Apr. 10, 2014

(65) Prior Publication Data
US 2015/0252735 A1    Sep. 10, 2015

(30) Foreign Application Priority Data

Oct. 3, 2012   (JP) ................................. 2012-220974

(51) Int. Cl.
*F02D 13/02* (2006.01)
*F02N 11/08* (2006.01)
(Continued)

(52) U.S. Cl.
CPC .......... *F02D 13/0238* (2013.01); *F01L 1/344* (2013.01); *F02D 13/08* (2013.01);
(Continued)

(58) Field of Classification Search
CPC .. F02D 13/0223–13/0238; F02D 13/08; F02N 11/0814; F02N 11/0818;
(Continued)

(56) References Cited

U.S. PATENT DOCUMENTS 5,924,395 A * 7/1999 Moriya ..................... B60K 6/46
                                                        123/179.18
9,121,358 B2 * 9/2015 Strehlau ................ F02D 41/062

FOREIGN PATENT DOCUMENTS

EP    0859130 A1    8/1998
JP    H02-173333 A    7/1990
(Continued)

OTHER PUBLICATIONS

Extended European Search Report dated Dec. 21, 2015 in European Patent Application No. 13843820.5.

*Primary Examiner* — Erick Solis
*Assistant Examiner* — Robert Werner
(74) *Attorney, Agent, or Firm* — Drinker Biddle & Reath LLP

(57) ABSTRACT

In a vehicle control device with an automatic engine stop function, when the engine is in a non-operating state and the shift lever is operated to the parking range, the engine is controlled to start to supply operating oil to a valve timing changing means. The valve timing changing means is thereupon caused to change the intake valve close timing (IVC) to a predetermined advance angle position and subsequently locked thereat. The engine is then controlled to stop.

2 Claims, 3 Drawing Sheets

(51) Int. Cl.
*F02D 13/08* (2006.01)
*F02D 17/00* (2006.01)
*F02D 29/02* (2006.01)
*F01L 1/344* (2006.01)
*F02N 19/00* (2010.01)
*F02N 15/06* (2006.01)
*F02D 41/00* (2006.01)
*F02N 11/04* (2006.01)

(52) U.S. Cl.
CPC ............ *F02D 17/00* (2013.01); *F02D 29/02* (2013.01); *F02N 11/0814* (2013.01); *F02N 11/0818* (2013.01); *F02N 11/0829* (2013.01); *F02N 15/067* (2013.01); *F02N 19/004* (2013.01); *F01L 2001/34459* (2013.01); *F01L 2001/34463* (2013.01); *F01L 2800/01* (2013.01); *F01L 2800/03* (2013.01); *F02D 2041/001* (2013.01); *F02N 11/04* (2013.01); *F02N 11/0803* (2013.01); *F02N 2011/0888* (2013.01); *F02N 2200/061* (2013.01); *F02N 2200/0802* (2013.01); *F02N 2200/0803* (2013.01); *Y02T 10/18* (2013.01); *Y02T 10/48* (2013.01)

(58) Field of Classification Search
CPC ............ F02N 11/0822; F02N 11/0829; F02N 11/084; F02N 11/0844; F02N 11/08–11/0866; F01L 2800/00–2800/03; B60W 20/00–20/50; B60W 30/192
USPC ........... 701/22, 111–113; 123/321, 322, 347, 123/348, 90.16; 180/65.21, 65.265, 180/65.275–65.28
See application file for complete search history.

(56) References Cited

FOREIGN PATENT DOCUMENTS

| | | |
|---|---|---|
| JP | 2002-309974 A | 10/2002 |
| JP | 2007-064127 A | 3/2007 |
| JP | 2010-203315 A | 9/2010 |
| JP | 2011-163318 A | 8/2011 |
| JP | 2011-179418 A | 9/2011 |
| JP | 2012-035783 A | 2/2012 |
| JP | 2012-086769 A | 5/2012 |

* cited by examiner

VEHICLE CONTROL DEVICE WITH AUTOMATIC ENGINE STOP FUNCTION

The present invention relates to a vehicle control device, which includes an engine as a power source equipped with a valve timing change mechanism to change the valve timing of the engine.

BACKGROUND

A technique for a valve timing control apparatus for an engine is disclosed in Patent Document 1. In this publication, a valve timing change mechanism is provided which is operated by an oil pump as a hydraulic source, and, when an ignition switch has been turned off, in order to shift to and subsequently lock the valve timing at a predetermined advance position (somewhere slightly advance position than a substantially intermediate position between the most retard position and the most advance position), the valve timing change mechanism will be operated by delaying the engine stop for a predetermined time.

PRIOR ART LITERATURE

Patent Document

PATENT DOCUMENT 1: Japanese Patent Application Publication JP 2011-179418 A

SUMMARY OF THE INVENTION

Problem to be Solved by the Invention

When moving to the predetermined advance position when the ignition switch is off, there is a large amount of movement up to the advance position, and the time required for delaying the engine stop may become longer. This means that the engine ignition state continues despite turning off of the ignition switch, which would give a feel of discomfort for the driver. Also, as in the case of a vehicle with an automatic engine stop function (e.g. a hybrid vehicle and an idling stop function equipped vehicle), the engine is stopping with the ignition switch being in an ON state. Thus, even when the ignition switch is turned off, since the engine is stopped, it is impossible to operate the valve timing change mechanism.

The present invention was made in view of the above problem. The object thereof is to provide a vehicle control device with an automatic engine stop function, which is capable of suppressing the discomfort to the driver and of shifting the valve timing mechanism to a predetermined position.

Mechanism for Solving the Problem

In order to achieve the above object, in the vehicle control device with an automatic engine stop function, when a shift lever is operated to a parking range with an engine in a non-operating state, the engine is caused to be started to supply an operating oil to a valve timing change mechanism to thereby change to and lock at the predetermined advance position. The engine will then be caused to stop.

Effect of the Invention

Thus, since the valve timing will move or shift to a predetermined advance position at a stage where the parking range is selected, while suppressing the uncomfortable feeling of the driver due to the ignition state of the engine being continued with the ignition switch being turned off, the valve timing mechanism may be shifted to the predetermined advance position at the time of system stop.

DESCRIPTION OF REFERENCE NUMERALS

Figure 1:
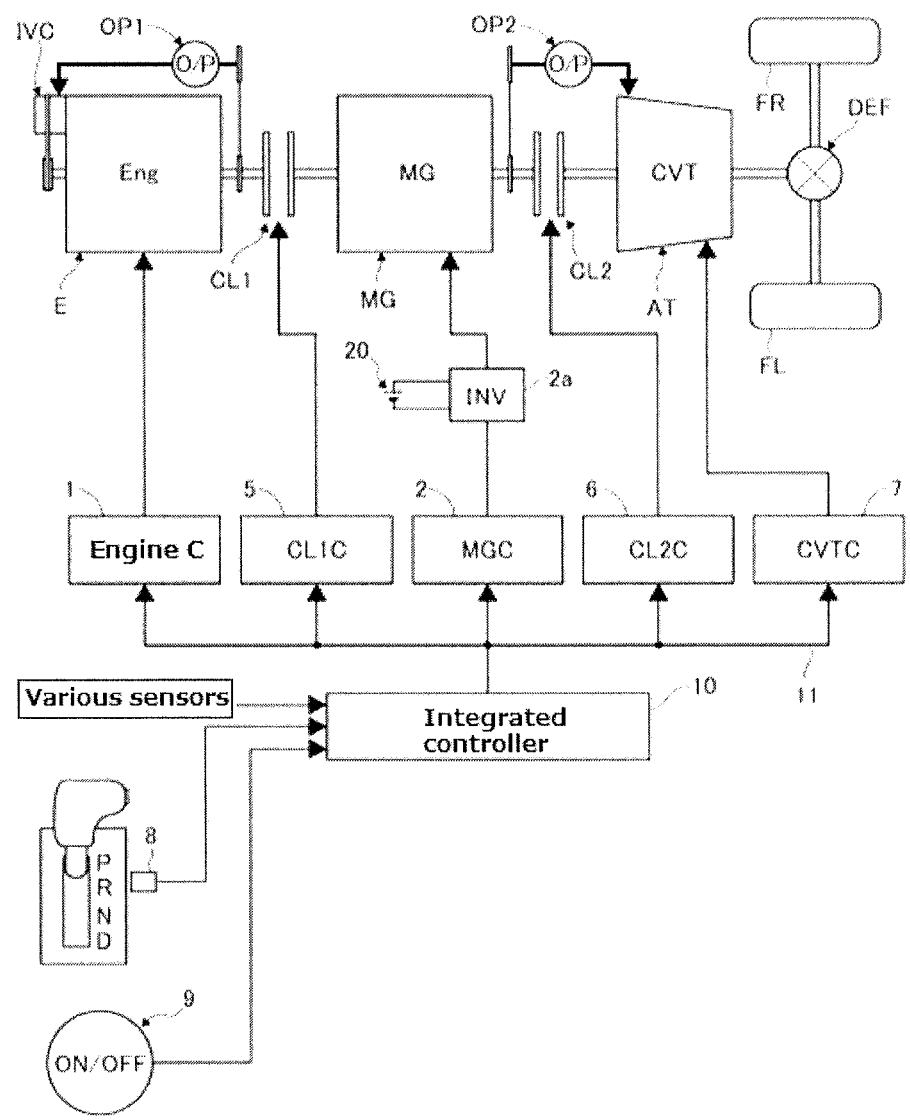
FIG. 1 is an overall system diagram showing a hybrid vehicle in a first embodiment.

E engine
CL1 first clutch
MG motor generator
CL2 second clutch
CVT belt-type continuously variable transmission
1 engine controller
2 motor controller
5 first clutch controller
6 second clutch controller
7 CVT controller
8 range position sensor
9 ignition switch
10 integrated controller
20 battery
IVC valve timing change mechanism
OP1 IVC pump
OP2 transmission pump

EMBODIMENT FOR CARRYING OUT THE INVENTION

First Embodiment

First, description is given of a driving system of a hybrid vehicle as an example of a vehicle with an automatic engine stop capability. FIG. 1 is an overall system diagram showing a hybrid vehicle in a first embodiment according to the present invention. As shown in FIG. 1, the driving system of the hybrid vehicle in the first embodiment includes an engine E, a first clutch CL1, a motor generator MG, a second clutch CL2, a belt-type continuously variable transmission CVT, a propeller shaft, a differential DF, a left drive shaft DSL, a right drive shaft DSR, a left front wheel (driving wheel) FL, and a right front wheel (driving wheel) FR.

Engine E is, for example, a gasoline engine. A valve opening of throttle valve of the engine E is controlled based on a control command from an engine controller 1 described below. Further, the engine E is provided with a valve timing change mechanism IVC (Intake Valve Close) which can change intake valve timing. Specifically, the valve timing change mechanism is operable, as a hydraulic source, by an IVC pump OP1 driven by the engine E so that the intake valve timing may be variable within a range between the most retard angle position and the most advance angle position. Further, a locking mechanism is provided for fixing or locking the valve timing to the predetermined timing even with the IVC pump OP1 being in a non-operation state. The locking mechanism is configured to include a first locking mechanism that may lock the valve timing to the most retard angle position as well as a second locking mechanism that may lock the valve timing to an intermediate position located slightly advance side of the middle between the most retard position and the most advance position. Below, a valve timing fixed or locked by the first locking mechanism is referred to as decompression valve timing (most retard position), while a valve timing locked by the second locking mechanism will be referred to as an intermediate lock valve timing. Also, although a specific locking mechanism is not provided, a valve timing which is set during idling of the engine E will be referred to as idling valve timing.

The first clutch CL1 is a clutch interposed between the engine E and motor generator MG, and is controlled to selectively engage and disengage the clutch including a slip engagement.

The motor generator MG is a synchronous motor generator including a rotor having permanent magnets embedded in the rotor, and a stator having stator coils wound around the stator. The motor generator MG is controlled by applying a three-phase alternating current (AC) produced by an inverter 2a based on a control command from a motor controller 2. This motor generator MG serves as an electric motor arranged to drivingly rotate by receiving supply of an electric power from a battery 20 (hereinafter, referred to as "drive mode"), and serves as a generator arranged to generate an electromotive force between both ends of each stator coil when the rotor is rotated by an external force to charge the battery 20 (hereinafter, referred to as "regenerative mode").

The second clutch CL2 is disposed between the motor generator MG and the belt-type continuously-variable transmission CVT. The second clutch CL2 is controlled to engage or disengage including a slip engagement by a control hydraulic pressure produced by a second clutch hydraulic unit based on a control command from the CL2 controller 6.

The belt-type continuously variable transmission CVT includes a primary pulley, a secondary pulley, and a belt wound around the primary and secondary pulleys. By changing a pulley groove width in accordance with a pulley hydraulic pressure, a speed ratio may be changed continuously and the speed ratio may be controlled in accordance with a control command from the CVT controller 7. Moreover, the belt-type continuously variable transmission CVT has a transmission pump OP2 which is driven by the motor generator MG to ensure the hydraulic pressure by the operation of the motor generator MG even when the engine is stopped. Thus, the speed ratio, the engaged state of the second clutch CL2, and the like may be held under control.

An output shaft of the belt-type continuously variable transmission CVT is connected with left and right front wheels FL and FR through a propeller shaft as a vehicle driving shaft PS, a differential gear DF, a left drive shaft DSL and a right drive shaft DSR. Each of the first and second clutches CL1 and CL2 is of a wet-type multiple-plate clutch in which a hydraulic pressure and a flow rate of the hydraulic fluid can be continuously controlled by a proportional solenoid.

This hybrid drive system includes at least two running modes depending upon the engagement/disengagement state of the first clutch CL1. The first running mode is an electric vehicle running mode which is a motor-use running mode in which the vehicle runs only by the power of motor generator MG with the first clutch CL1 in the disengaged state (hereinafter, referred to as "EV running mode"). The second mode is an engine-use running mode in which the vehicle runs by the power source including engine E in the engagement state of first clutch CL1 (hereinafter, referred to as "HEV running mode").

Note that, when the vehicle shifts from the EV running mode to the HEV running mode, the first clutch CL1 is engaged to perform the engine start using the torque of motor generator MG.

The above-described "HEV running mode" includes an "engine running mode", a "motor assist running mode", and an "electric generation running mode". In the engine running mode, the driving wheels are driven by using engine E only as the power source. In the motor assist running mode, the driving wheels are driven by using engine E and motor generator MG as the power source. In the electric generation running mode, driving wheels FL and FR are driven by using engine E as the power source, and simultaneously the motor generator MG is operated as the electric generator. In the constant speed running or in the acceleration running, the motor generator MG is operated as the electric generator by using the power of engine E. In the deceleration running, the motor generator MG regenerates the brake energy, and generates an electricity to charge the battery 20. In addition, there is an electric generation mode in which the motor generator MG is operated as the electric generator by using the power of engine E when the vehicle is stopping. In the electric generation mode, when the SOC (State Of Charge) of the battery 20 falls below an electricity generation requirement threshold SOC1, electricity will be held generated until exceeding the SOC1. Upon exceeding SOC1, the engine E is caused to stop and the electricity generation mode will end.

An integrated controller 10 monitors energy consumption of the entire vehicle, and operates to run the vehicle at best efficiency, and receives various sensor information, a range position information detected by a range position sensor 8 provided on the shift lever, an ignition ON/OFF information of the ignition switch 9, and information acquired via CAN communication line 11. Also, the integrated controller 10 performs an operation control of the engine E by a control command to the engine controller 1, an operation control of the motor generator MG by the control command to the motor controller 2, an engagement/disengagement control of the first clutch CL1 by a control command to the first clutch controller 5, an engagement/disengagement control of the second clutch CL2 by a control command to the second clutch controller 6, and a shift control by a control command to the CVT controller 7, respectively.

(Valve Timing Control Process)

Now, description is given of a valve timing control process for controlling the valve timing from a state other than the position of the intermediate lock valve timing during parking to a state of the intermediate lock valve timing. First, description is given of the need for valve timing control process. The valve timing change mechanism IVC controls the valve timing to the decompression valve timing when an Engine E is stopped with the HEV running mode changed to the EV running mode in a state in which the Engine has completed warmup cycle, for example. This operation is intended to allow the engine speed to exit quickly the low rotation speed region (e.g. 200 rpm to 400 rpm) in which the engine rotation speed and the vehicle body resonate each other, when restarting the engine during the time in which the friction is sufficiently reduced by the warm up cycle. In other words, the control to the decompression valve timing will allow an intake valve close timing to delay when approaching a piston top dead center to thereby reduce a pumping load or loss in an engine cylinder.

On the other hand, in the case of system stop due to an ignition being turned off, it is not known in which timing the ignition will be turned on again. In such a case, when the engine is caused to stop in the state of decompression valve timing and the engine will be restarted next with great engine friction such as during cold start, there is a possibility that a sufficient torque may not be available to ensure an appropriate engine start operation. Therefore, in a situation where there is a possibility that a cold start is performed, by setting the valve timing to the intermediate lock valve timing, the torque necessary for engine start will be ensured by securing the pumping load in the engine cylinder without delaying the intake valve close timing.

In a hybrid vehicle in the first embodiment, in such a case in which ignition is turned off in the state of decompression valve timing or in the idling valve timing slightly retard than the intermediate lock valve timing, when the engine E would be stopped without taking any measures, at the restart of the engine by ignition ON, there is a possibility that an appropriate valve timing is not available. Therefore, when the engine stops associated with the ignition OFF, it is preferable to stop the operation of the engine E after the transition to the intermediate lock valve timing has been done.

However, in the case of a hybrid vehicle, due to the need of increasing the fuel economy to the limit, and, because of the reasoning that the operation may be recoverable by a motor generator MG when the engine start should fail by a normal starter motor, there is a strong tendency in which the decompression valve timing and the idle valve timing are set in the extremely retard angle position. Therefore, when shifting to the position of the intermediate lock valve timing, compared to an engine propelled vehicle, the control amount (e.g. the range of angle to be travelled from a retard angle position to an advance angle position) is great and the associated shift operation may be time consuming.

In this case, in the hybrid vehicle in the first embodiment, since a low-cost valve timing change mechanism IVC using the IVC pump OP1 driven by the engine E as a hydraulic source is employed, it is not possible to shift to the intermediate lock valve timing unless the engine E is in operation. In other words, there is a possibility that it takes time to stop the engine E from the ignition being OFF, which may cause discomfort to the driver. Also, when the ignition is turned off while the engine is stopping during a vehicle travel in the EV running mode, there is a risk that the system is stopped while the decompression valve timing is in position.

Therefore, in the first embodiment, without waiting for the ignition off, in a state of high possibility that the ignition will be turned off, and no uncomfortable feeling would not be given to the driver, the valve timing is shifted to the intermediate lock valve timing immediately before an engine stop. Thus, the problem discussed above will be resolved. More specifically, when a P range position is detected with an engine being stopped, the engine E is started and the valve timing is shifted to the intermediate lock valve timing immediately before the engine stop in a state in which the engine stop condition has been satisfied.

Figure 2:
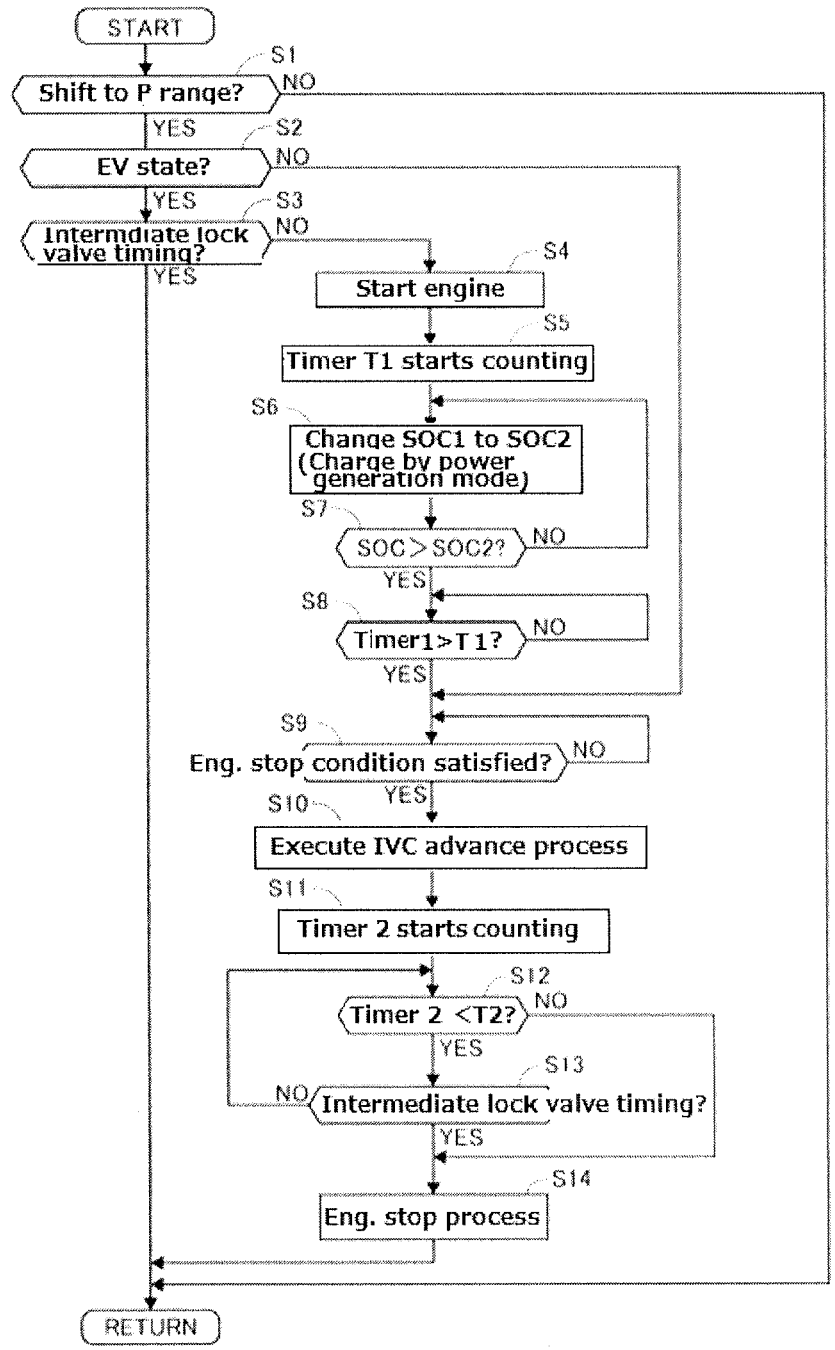
FIG. 2 is a flowchart showing a valve timing control process executed in a hybrid vehicle control device in the first embodiment.

FIG. 2 is a flowchart showing valve timing control process executed in the control device for a hybrid vehicle in the first embodiment.

In step S1, it is determined whether or not the shift position is in P range, and if the P range is confirmed, control proceeds to step S2. Otherwise, control ends.

In step S2, it is determined whether or not the EV mode is in place, and control proceeds to step S3 if the EV running mode is confirmed while, in the HEV running mode, control proceeds to step S9.

In step S3, it is determined whether the valve timing change mechanism IVC is positioned in the intermediate lock valve timing. If the intermediate lock valve timing is ascertained, control ends. When the intermediate lock valve timing is not detected to be positioned, control proceeds to step S4.

In step S4, engine start-up is performed. Specifically, the first clutch CL1 is engaged, the engine speed is raised by the rotation speed control of the motor generator MG, then an idle state will be established by performing fuel supply.

In step S5, count-up of the first timer will be started.

In step S6, the power generation request threshold at which power or electricity generation by the power generation mode is started will be changed from SOC1 to SOC2, which is greater than SOC1. When the current SOC is detected to be greater than SOC2, power generation by the power generation mode will not be performed and the engine E will be held in idle state.

In step S7, it is determined whether or not SOC is greater than SOC2, and when determined to be greater than SOC2, control proceeds to step S8. Otherwise, step S6 is repeated. More specifically, when SOC is greater than SOC1, yet less than SOC2, the power generation mode continues until exceeding SOC2.

In step S8, it is determined whether or not the count value of the first timer has passed a predetermined time T1 (for example, 20 seconds), and when not elapsed, the present step will be repeated until elapse thereof. When elapsed, control proceeds to step S9. In other words, the operation state of the engine E will be maintained until elapse of the predetermined time T1 after SOC has achieved above SOC2 in the power generation mode. This is intended to avoid the discomfort caused by frequent startup and stopping operations of the engine E.

That is, in the case of the SOC being left at the normal power generation request threshold SOC1, once the engine E is stopped and restarted immediately thereafter, since the battery power consumption may be heavy depending upon the parked conditions, an earlier engine restart may be assumed. For example, after the engine is stopped, in such a case in which the motor idle state by the idling rotation of the motor generator MG is held or an air conditioner will be continuously operated, the power consumption of the battery 20 is severe and SOC is likely to fall below SOC1. Therefore, when the P range is selected with the EV drive mode and the engine E is started, SOC is changed to SOC2 so that the storage amount or charge capacity of the battery 20 is secured to a larger amount. By this operation, since the time required for securing the storage amount is longer, the engine is continuously held in operation. In addition, after engine stop, due to sufficient storage amount of the battery 20, the engine may be continued to be stopped for a long time, which in time may avoid a situation in which the engine stop and start is frequently repeated.

In step S9, it is determined whether or not the engine stop condition is satisfied, and control proceeds to step S10 when the condition is determined to have established.

Otherwise, the step will be repeated until satisfied. Here, the engine stop condition is satisfied, for example, when the condition other than the ignition off is present such as when the air conditioner is put off or a door is open where the passenger leaves the vehicle while the ignition is turned on.

In step S10, the advance processing of the valve timing change mechanism IVC before engine stop is performed, and shift and lock into the intermediate lock valve timing will be performed.

In step S11, the second timer starts counting up.

In step S12, it is determined whether or not the count value of the second timer has elapsed a predetermined time T2 (for example, 3 seconds), and when elapsed, control proceeds to step S14. Otherwise, control proceeds to step S13.

In step S13, it is determined whether or not shift or move to the intermediate lock valve timing and subsequent locking by the second lock mechanism are complete, and if completed, control proceeds to step S14. When it is determined that locking is not completed, control returns to step S12 to continue the advance angle process. Note that, in order to confirm the lock completion, a hydraulic switch, a contact switch, and the like may be provided with the second lock mechanism to determine the lock completion. Alternatively, lock completion may be assumed after a predetermined time has been elapsed subsequent to the output of the actuation signal of the second lock mechanism. In step S14, engine stop process is executed.

Figure 3:
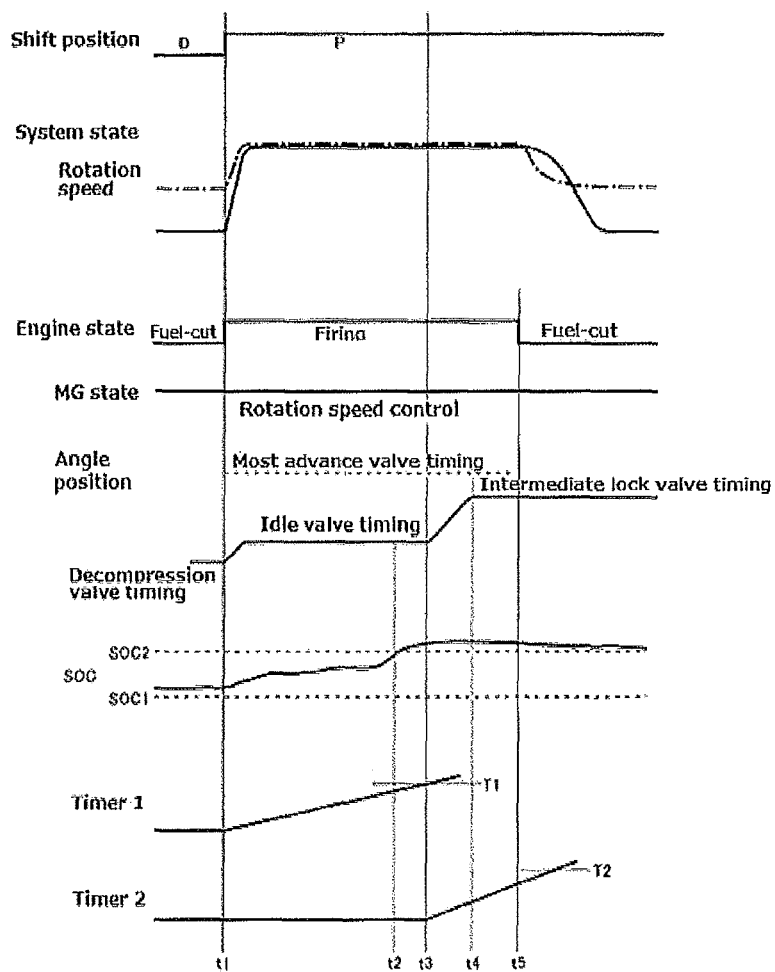
FIG. 3 is a time chart showing the valve timing control process executed at the time of a P range selection in the hybrid vehicle control device in the first embodiment.

FIG. 3 is a time chart showing valve timing control process executed when the P range selection is confirmed in the control device for a hybrid vehicle in the first embodiment. The time chart shows the case in which, during a vehicle stop state with an engine being out of operation, selection is performed from the D range position to the P range position. Note that, the state prior to engine start is a vehicle stopped state in which the engine E is in operation with the first clutch CL1 released and the second clutch CL2 released. In addition, it is assumed that the motor generator MG is put in a rotation control to maintain the idle rotation speed.

At time t1, when the P range position is selected by the driver's operation of a shift lever, the first clutch CL1 is engaged to start the engine start process by the motor generator MG and the first timer starts to count up. At this time, the valve timing change mechanism IVC is positioned in the decompression valve timing because of the engine stopped state in the EV running mode.

At the same time, the power generation request threshold is changed from SOC1 to SOC2, although the SOC is greater than SOC1, which is less than SOC2. The power generation mode is thus selected and the power generation by the motor generator MG is performed by the driving force of the engine E.

At time t2, since SOC exceeds the power generation threshold SOC2 before the predetermined time T1 has elapsed, power generation mode terminates. However, since the predetermined time T1 has not elapsed, the engine E is maintained in the operating state. Thus, frequent stops of the engine E may be avoided.

At time t3, upon the predetermined time T1 having elapsed, then it is determined whether or not the engine stop condition is satisfied. Since the engine stop condition is satisfied, along with start of changing operation to the intermediate lock valve timing by the valve timing change mechanism IVC, the second timer starts to count up.

At time t5, when it is determined that transfer to the intermediate lock valve timing is completed reliably before elapse of the predetermined time T2, the engine E is stopped by releasing the first clutch CL1. The engine E will stop in response to a rotation speed reduction thereof depending upon inertia and friction, Note that, since the motor generator MG transfers to a motor idle state, the idle rotation speed will be maintained. Note that, even at elapse of the predetermined time T2, shift to the intermediate lock valve timing or lock completion is not determined, the system will be caused to stop after elapse of the predetermined time T2. Thus, the situation is avoidable in which the system fails to stop.

As described above, in the hybrid vehicle in the first embodiment, it is possible to obtain the effects listed below.

(1) Provided are a IVC pump OP1 (pump) which is driven by the engine E;

a valve timing change mechanism IVC (valve timing change means) including a second lock mechanism which is supplied with operating oil or hydraulic fluid by the IVC pump OP1 and is capable of changing the intake valve position between an advance side and a retard side in a predetermined range and locking into an intermediate lock valve timing (predetermined advance angle position) irrespective of presence of the operating oil; and a shift lever 8 operable by the driver and having a parking range to achieve the vehicle parking state, wherein engine stopping steps to cause the engine E to stop, steps S1, S2, S3, S4, S10, S13, S14 (valve timing control means) are provided, according to which, when the engine E is in non-operating state and the shift lever is operated to the parking range, the engine E is caused to start to supply the operating oil to thereby actuate and lock the valve timing change mechanism IVC to the intermediate lock valve timing, and the engine E is subsequently caused to stop.

Therefore, it is possible to move to the intermediate lock valve timing at the stage of selection of the parking range. Thus, even when the ignition switch is turned off subsequently thereof and the vehicle system is stopped, it is possible to reliably restart the engine next time the ignition is turned on.

(2) A power generation mode (charging means) is provided to charge the battery 20 in order for the storage amount to achieve SOC1 or more and power or electricity is generated by the motor generator MG using the driving force of the engine E, when the storage amount of the battery 20 is less than SOC1 (first predetermined value). In step S6, SOC1 is changed to SOC2 (second predetermined value). The valve timing change mechanism IVC will be actuated after the storage amount has reached SOC2 or more. By this configuration, since the time required will be longer until the storage amount is secured, the engine may be held in operation continuously. Also, even after engine stop, because of sufficient storage amount of the battery 20, the engine may be held in a stopped state for a long period time. Therefore, it is possible to avoid a situation in which frequent engine stop and start will be frequently repeated.

(3) As shown in step S8 and step S10, after the engine E is started and the predetermined time T1 has passed, then the valve timing change mechanism IVC is allowed to operate.

In other words, even when SOC reaches SOC2 or more by the power generation mode, the engine E will be held in operating state until the predetermined time T1 elapses. Thus, it is possible to avoid the discomfort caused by frequent repeats of startup and stopping of the engine E.

In the present embodiment, the hybrid vehicle is set as an example, the similar effect may be obtained with respect to a vehicle with an idling stop function.

The invention claimed is:

1. A vehicle control device for a vehicle with an automatic engine stop function, the vehicle being selectively operable either in EV mode in which the vehicle runs only by power of a motor or in HEV mode in which the vehicle runs by a power source including an engine, the vehicle control device comprising:
- a pump driven by the engine for supplying an operating oil;
- a valve timing change means that is supplied with the operating oil for changing an intake valve timing in a predetermined range between an advance side and a retard side, the valve timing change means being configured to lock the intake valve timing to a predetermined advance position in response to the engine being put in a non-operating state by an ignition OFF irrespective of presence or absence of the operating oil, the valve timing change means being configured to control the intake valve timing to a predetermined decompression valve timing when the engine is in the EV mode, wherein the predetermined advance position is more advanced than the predetermined decompression valve timing;
- a shift lever that is operable by the driver and includes a parking range to achieve the vehicle parking state;
- an engine controller that is configured, when the engine is in non-operating state and the shift lever is operated to the parking range,
  - to start the engine to supply the operating oil to thereby actuate the valve timing change means;
  - to change to and subsequently lock the valve timing change means into the predetermined advance position; and
  - to stop the engine thereafter.

2. The vehicle control device as claimed in claim 1, wherein the engine controller is configured to actuate the valve timing change means after a predetermined time corresponding to the predetermined time period has elapsed from the start of the engine.

\* \* \* \* \*